United States Patent
Shumway et al.

(10) Patent No.: US 9,354,350 B2
(45) Date of Patent: May 31, 2016

(54) MAGNETIC FIELD SENSING TOOL WITH MAGNETIC FLUX CONCENTRATING BLOCKS

(75) Inventors: Jim Shumway, Provo, UT (US); Scott Woolston, Provo, UT (US); Jacques Orban, Provo, UT (US); Daniel Manwill, Provo, UT (US); Kevin Rees, Orem, UT (US); Christopher Jones, Provo, UT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 545 days.

(21) Appl. No.: 13/479,263

(22) Filed: May 23, 2012

(65) Prior Publication Data

US 2013/0314092 A1    Nov. 28, 2013

(51) Int. Cl.
*G01V 3/26* (2006.01)
*G01V 3/40* (2006.01)

(52) U.S. Cl.
CPC ..... *G01V 3/40* (2013.01); *G01V 3/26* (2013.01)

(58) Field of Classification Search
CPC .................................. G01V 3/40; G01V 3/26
USPC ............ 324/207.2, 207.21, 207.25, 220–221, 324/244, 251–252
See application file for complete search history.

(56) References Cited

U.S. PATENT DOCUMENTS

| | | | |
|---|---|---|---|
| 2,003,179 A * | 5/1935 | Faus ................................. | 33/345 |
| 2,470,828 A * | 5/1949 | Millington et al. ........... | 324/221 |
| 3,007,109 A * | 10/1961 | Swift ............................. | 324/221 |
| 3,091,733 A * | 5/1963 | Fearon et al. .................. | 324/220 |
| 3,361,964 A * | 1/1968 | Hanson et al. ................. | 324/663 |
| 4,482,255 A * | 11/1984 | Gygax et al. .................... | 368/10 |
| 4,614,041 A * | 9/1986 | Darton et al. ................... | 33/313 |
| 4,789,827 A * | 12/1988 | Bergander .................... | 324/220 |
| 5,510,708 A * | 4/1996 | Shirai et al. ................... | 324/174 |
| 5,889,215 A * | 3/1999 | Kilmartin et al. ........ | 73/862.335 |
| 6,278,271 B1 * | 8/2001 | Schott ........................... | 324/251 |
| 6,593,734 B1 * | 7/2003 | Gandel et al. ............ | 324/207.25 |
| 2006/0202699 A1 | 9/2006 | Reiderman | |
| 2007/0203651 A1 | 8/2007 | Blanz et al. | |
| 2007/0247330 A1 | 10/2007 | Clark | |
| 2007/0289779 A1 | 12/2007 | Howard et al. | |
| 2012/0007597 A1* | 1/2012 | Seeger et al. ................. | 324/244 |

FOREIGN PATENT DOCUMENTS

| | | | | |
|---|---|---|---|---|
| GB | 2093591 A | * | 9/1982 | ............ G01C 17/28 |
| WO | 0177702 A1 | | 10/2001 | |

* cited by examiner

*Primary Examiner* — Jay Patidar
(74) *Attorney, Agent, or Firm* — Kimberly Ballew

(57) ABSTRACT

A magnetometer includes a sensor housing having an internal bore formed therethrough and a magnetic field sensor disposed within the internal bore of the sensor housing. The magnetic field sensor is fixedly mounted within the internal bore of the sensor housing. A magnetic flux concentrating block is disposed proximate to an end of the at least one magnetic field sensor. An electronics unit is disposed within the internal bore of the sensor housing and is operatively and communicatively connected to the magnetic field sensor. The electronics unit is configured to receive a signal from the magnetic field sensor.

17 Claims, 12 Drawing Sheets

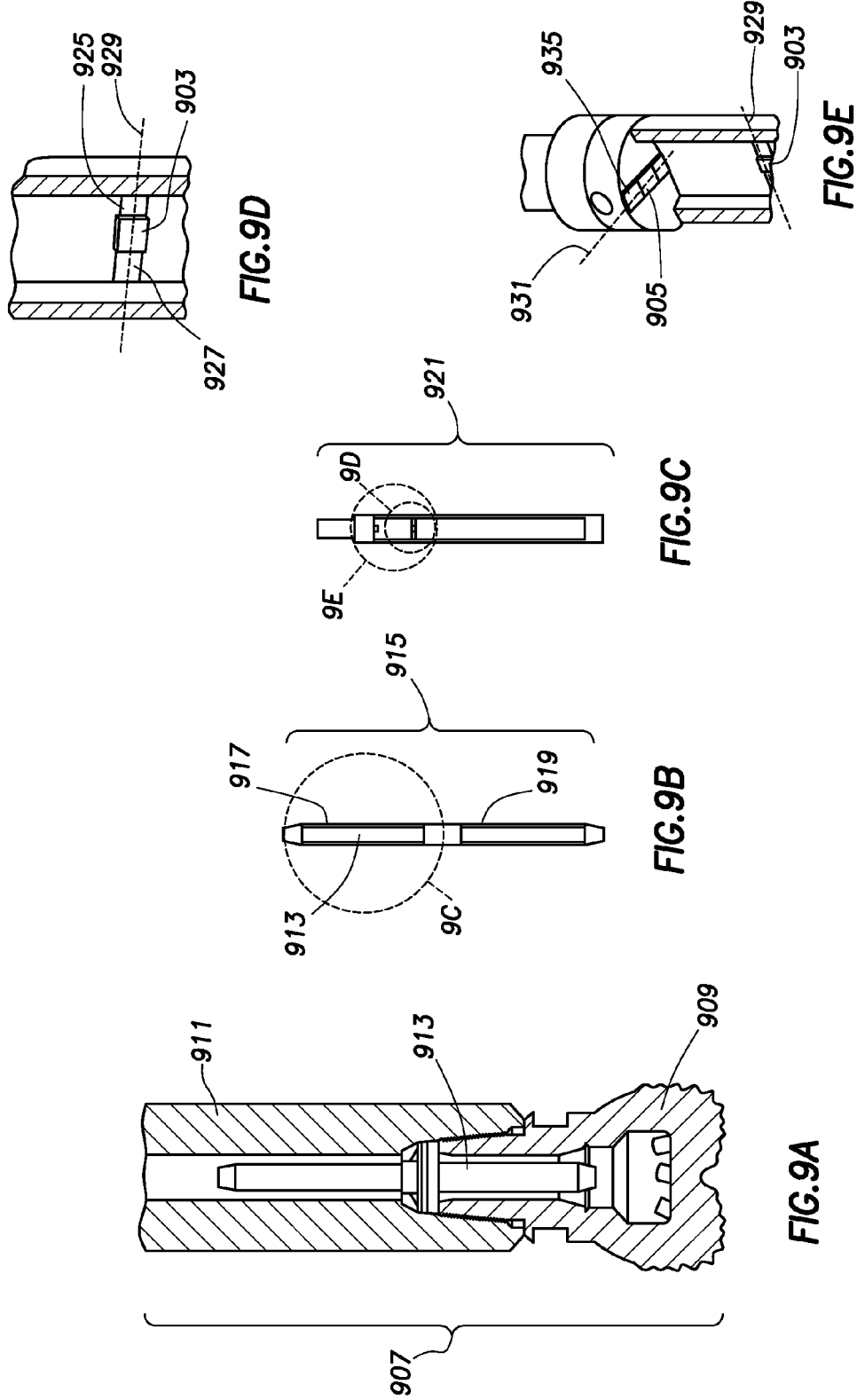

MAGNETIC FIELD SENSING TOOL WITH MAGNETIC FLUX CONCENTRATING BLOCKS

BACKGROUND

Magnetometers are often used in the wellbore as devices that aid in surveying. For example, a down-hole tool may include magnetometers to measure the position of the tool versus the Earth magnetic vector and to determine the azimuth of the tool. Magnetic measurements such as these may be used to obtain wellbore azimuth as well as the magnetic tool face of the tool in the well. The wellbore inclination and azimuth taken together with other survey data such as measured depth, make it possible to determine the wellbore trajectory, thereby aiding the driller in implementation of the drilling plan.

Measurement while drilling (MWD) tools allow data to be collected while drilling. The collected data may then be transmitted to the surface, e.g., using mud pulse or electromagnetic (Emag) telemetry. The ability of MWD tools to collect a wealth of data underlies the current success of modern directional drilling techniques. For example, measurement of the Earth's magnetic flux while downhole allows for the determination of magnetic tool face (the angular orientation of the tool in the well) thereby allowing the operator to set the angular orientation of a device in a wellbore, e.g., the bend of a steering motor or the orientation of a whipstock. Furthermore, magnetic tool face can be measured in a dynamic fashion during rotation of the drill collar. This type of dynamic measurement technique is commonly employed in rotary steerable systems (RSS). Dynamic data logging is also employed with logging while drilling (LWD) tools. For example, in dynamic data LWD devices, magnetic tool face may be continuously determined while the collar rotates to allow the proper mapping of logged data versus angular position in the wellbore. Furthermore, a measurement of the toolface versus time allows for the calculation of the rotational velocity and acceleration of the tool by way of the first and second derivatives, respectively, of the tool-face-versus-time data.

Down-hole magnetometers may be very sensitive to external perturbations of the Earth's magnetic field. Thus, theses magnetometers should be deployed within non-magnetic tubulars or drill collars. Furthermore, extra lengths of non-magnetic drill collar should be used in bottom hole assemblies (BHAs) that employ MWD tools having magnetometers to ensure that the magnetometer measurements are not systematically affected by any surrounding magnetic material. For similar reasons, in directional drilling operations, kick-off from vertical in wells in close proximity to many other cased wells is preferably done using non-magnetic based navigation systems. For similar reasons, the orientation of a whipstock inside casing is preferably not performed with magnetometers.

SUMMARY

In general, in one aspect, embodiments of the present disclosure relate to a downhole tool capable of sensing a magnetic field from the Earth from within a wellbore. The tool includes a cylindrical tubular member having an internal bore formed therethrough. In addition, the tool includes a magnetic field sensor disposed within the internal bore of the cylindrical tubular member. Disposed proximate to an end of the magnetic field sensor is a magnetic flux concentrating block. The tool further includes an electronics unit, operatively and communicatively connected to the magnetic field sensor. The electronics unit is configured to receive a signal from the magnetic field sensor.

In general, in one aspect, embodiments of the present disclosure relate to a magnetometer that includes a sensor housing having an internal bore formed therethrough and a magnetic field sensor disposed within the internal bore of the sensor housing. The magnetic field sensor is fixedly mounted within the internal bore of the sensor housing with a magnetic flux concentrating block disposed proximate to an end of the magnetic field sensor. The magnetometer further includes an electronics unit, disposed within the internal bore of the sensor housing, operatively and communicatively connected to the magnetic field sensor. The electronics unit is configured to receive a signal from the magnetic field sensor.

In general, in one aspect, embodiments of the present disclosure relate to a method for suppressing the effect of magnetic tubular magnetization from a measurement of Earth's magnetic field. The method includes generating an output signal by rotating, within the Earth's magnetic field, a magnetic tubular comprising a magnetic field sensor disposed within an internal bore of the magnetic tubular. A magnetic flux concentrating block is disposed proximate to an end of the magnetic field sensor. The method further includes receiving the magnetic field sensor output signal, by an electronics unit, operatively and communicatively connected to the magnetic field sensor and estimating, by the electronics unit, an offset component of the received magnetic field sensor output signal. The offset component corresponds to a tubular magnetization. The method further includes subtracting, by the electronics unit, the estimated offset component of the magnetic field sensor output signal from the received magnetic field sensor output signal to generate a compensated magnetic field sensor signal. The compensated magnetic field sensor signal is substantially independent of the magnetization of the magnetic tubular.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF DRAWINGS

FIGS. 9A-9E illustrate various components of an example device that may implement embodiments of sensing the magnetic field of the Earth within a wellbore;

DETAILED DESCRIPTION

Certain terms used throughout the following description and claims refer to particular features or components. As those having ordinary skill in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . . " Further, the terms "axial" and "axially" generally mean along or substantially parallel to a central or longitudinal axis, while the terms "radial" and "radially" generally mean perpendicular to a central or longitudinal axis.

Figure 1:
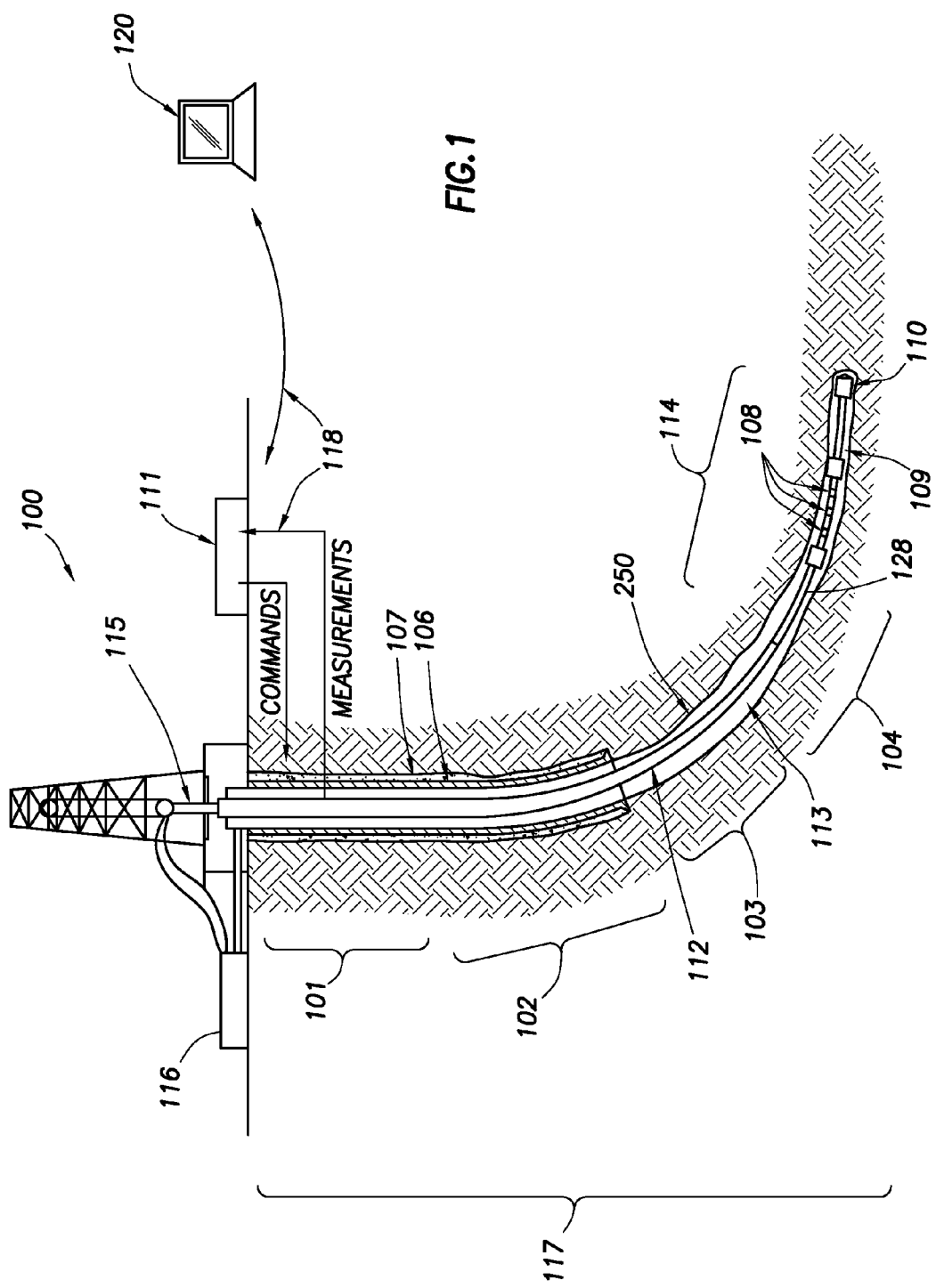
FIG. 1 illustrates an example system in which one or more embodiments of sensing the magnetic field of the Earth within a wellbore may be implemented.

FIG. 1 shows an example system in which embodiments of sensing the magnetic field of the Earth within a wellbore may be implemented. Specifically, FIG. 1 is a schematic view of a wellsite drilling system 100 depicting a directional drilling operation. In one or more embodiments, drilling tools are deployed from oil and gas rigs. The drilling tools are advanced into the earth along a path to locate reservoirs containing the valuable downhole assets. In one or more embodiments, the angular orientation of a downhole tool, may be adjusted using e.g., a steerable motor and based, in part, on positioning data obtained from a measurement of the Earth's magnetic field downhole using system in accordance with one or more embodiments. Specifically, in one or more embodiments, a measurement of the Earth's magnetic field downhole may be used to determine magnetic tool face, angular speed, and angular acceleration as well as angular positioning of the tool axis itself.

FIG. 1 further shows a diagram depicting a drilling operation of a directional well in multiple sections. The drilling operation depicted in FIG. 1 includes a wellsite drilling system 100 and computer system 120 for communication and control of various wellsite equipment. The wellsite drilling system 100 includes various components (e.g., drill string 112, annulus 113, BHA 114, Kelly 115, mud pit 116, etc.) as generally known in the art. As shown in FIG. 1, the target reservoir may be located away from wellsite drilling system 100. Accordingly, special tools or techniques may be used to ensure that the path along the wellbore 150 reaches the particular location of the target reservoir.

Downhole sensors or gauges are disposed about the drilling system to provide information about downhole conditions, such as wellbore pressure, weight on bit, torque on bit, direction, inclination, collar rpm, tool temperature, annular temperature, and toolface, among others. The information collected by the sensors and cameras is conveyed within the various parts of the drilling system and/or the surface control unit.

The BHA 114 further includes capabilities for measuring, processing, and storing information, as well as communicating with the surface unit. The BHA 114 further includes drill collars 128 for performing various other measurement functions. For example, the BHA 114 may include sensors 108, rotary steerable system (RSS) 109, and the bit 110 to direct the drill string toward the target reservoir, for example, using a pre-determined survey. Furthermore, the subterranean formation through which the directional well 117 is drilled may include multiple layers (not shown) with varying compositions, geophysical characteristics, and geological conditions. Both the drilling planning during the well design stage and the actual drilling according to the drilling plan in the drilling stage may be performed in multiple sections (e.g., sections 101, 102, 103, 104) corresponding to the multiple layers in the subterranean formation. For example, certain sections (e.g., sections 101 and 102) may use cement 107 reinforced casing 106 due to the particular formation compositions, geophysical characteristics, and geological conditions.

Furthermore, in accordance with one or more embodiments, the BHA may include a system for measuring the Earth's magnetic field $B_{EARTH}$. Furthermore, through the measurement of $B_{EARTH}$, a quantity known as magnetic tool face may also be determined. Magnetic tool face, or the angular orientation of the tool within the well section with respect to the magnetic field in that well section, is useful for determining the angular position, rotational velocity and acceleration of the tool in the wellbore. Furthermore, in accordance with one or more embodiments, multiple magnetic field sensors may be used in order to determine the angular position of the tool relative to the magnetic field in that well section. For example, three sensors placed at right angles relative to each other and at equal angles relative to the tool axis enables the system to locate the orientation of the tool axis with respect to the magnetic field in that well section, allowing the determination of the azimuth with respect to North, as well as the magnetic tool face.

Figure 2:
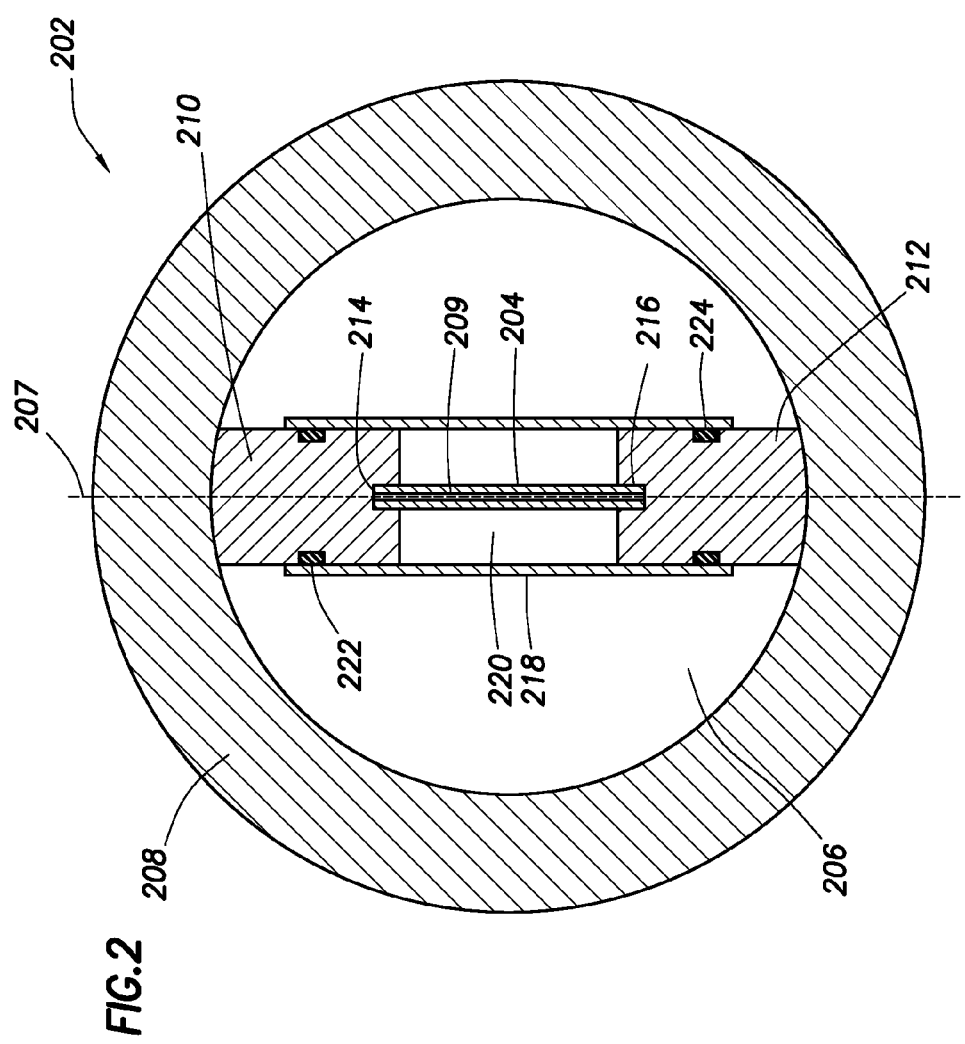
FIG. 2 illustrates various components of an example device that may implement embodiments of sensing the magnetic field of the Earth within a wellbore.

FIG. 2 shows an example of a downhole tool 202 capable of sensing $B_{EARTH}$ from within a borehole in accordance with one or more embodiments. The downhole tool includes magnetic field sensor 204 configured to have a measurement axis 207 disposed along its length. One of ordinary skill will appreciate that the magnetic field sensor 204 may be configured to measure the magnetic flux in a direction that is substantially parallel to measurement axis 207 (i.e., the amount of Earth magnetic field that crosses the cross-sectional area of the sensor 204). Further, one of ordinary skill will also appreciate that many different types of sensors are available, including sensors that perform measurements along multiple axes. A single axis sensor is shown here merely for the sake of simplicity and, thus, FIG. 2 is not intended to limit the attached claims to an embodiment having only one measurement axis. Furthermore, in accordance with one or more embodiments, the internal structure of the sensors may include some high permeability metal as core of the sensor, such as with a flux-gate magnetometer and a magneto-resistive sensor.

The magnetic field sensor 204 is disposed within an internal bore 206 of a cylindrical tubular member 208. In accordance with one or more embodiments, the magnetic field sensor 204 may be any known magnetic field sensor capable of sensing magnetic flux, e.g., a flux-gate magnetometer, a magneto-resistive sensor, a Hall effect sensor, or the like. In addition, the magnetic field sensors may also employ an optional magnetic core 209 that is disposed within the sensor. For example, in embodiments that employ a flux gate magnetometer as the magnetic field sensor 204, a ferromagnetic core, or the like, is used to enhance the efficacy of the sensor. Furthermore, the cylindrical tubular member 208 that surrounds the sensor assembly may be a drill collar of an MWD tool that may include one or more other sensors and electronics packages, e.g., electromagnetic transmitters/receivers, accelerometers, gyroscopes, resistivity sensors, gamma ray sensors, neutron sensors, etc. Furthermore, in accordance with one or more embodiments, the cylindrical tubular member need not be limited to a drill collar that is formed from non-magnetic materials, metals, or alloys; rather, the cylindrical tubular member may be formed from a magnetic material, e.g., magnetic steel, or other ferromagnetic, diamagnetic, paramagnetic materials, or the like.

In accordance with one or more embodiments, the ability to detect magnetic flux due to the Earth's magnetic field within cylindrical tubular member 208, when a magnetic tubular or drill collar is employed as the cylindrical tubular member 208, may be facilitated through the use of magnetic flux concentrating blocks 210, 212, formed of a high-permeability metal, for concentrating the magnetic flux (not shown) that enters cylindrical tubular member 208 and internal bore 206. The flux concentrating effect is described below in more detail below in reference to FIG. 3. Returning to FIG. 2, in the embodiment shown, magnetic flux concentrating blocks 210, 212 may be disposed within internal bore 206 and positioned at, on, or near, the ends 214, 216, respectively, of magnetic field sensor 204. In accordance with one or more embodiments, magnetic field sensor 204 employs a core 209 of high-permeability metal. In accordance with one or more embodiments, the magnetic flux concentrating blocks 210, 212 may be in the shape of plugs, as shown, that may fit onto the ends of the sensor housing 218, thereby creating cylindrically overlapping regions of magnetic material at the ends 214 and 216 of the magnetic field sensor 204. Furthermore, the plug shaped magnetic flux concentrating blocks 210, 212 may serve to seal off and/or isolate the internal chamber 220 from the sometimes harsh environmental conditions within internal bore 206. One of ordinary skill will appreciate that, for example, in the case where the system is employed as a part of a larger MWD tool, drilling mud may be pumped through the internal bore 206. In accordance with one or more embodiments, the plug shaped magnetic flux concentrating blocks 210, 212 may be further equipped with seals 222, 224 to allow the plugs to seal the internal chamber 220 from the internal bore 206, thus, allowing for a pressure differential to be developed between internal chamber 220 and internal bore 206. In accordance with one or more embodiments, seals 222, 224 may be o-rings that allow for internal chamber 220 to be held at atmospheric pressure regardless of the pressure in the internal bore 206, which may be much higher. Furthermore, in accordance with one or more embodiments, sensor housing 218 may be formed from a non-magnetic material in order to avoid perturbing the magnetic field entering the sensor 204.

Figure 3:
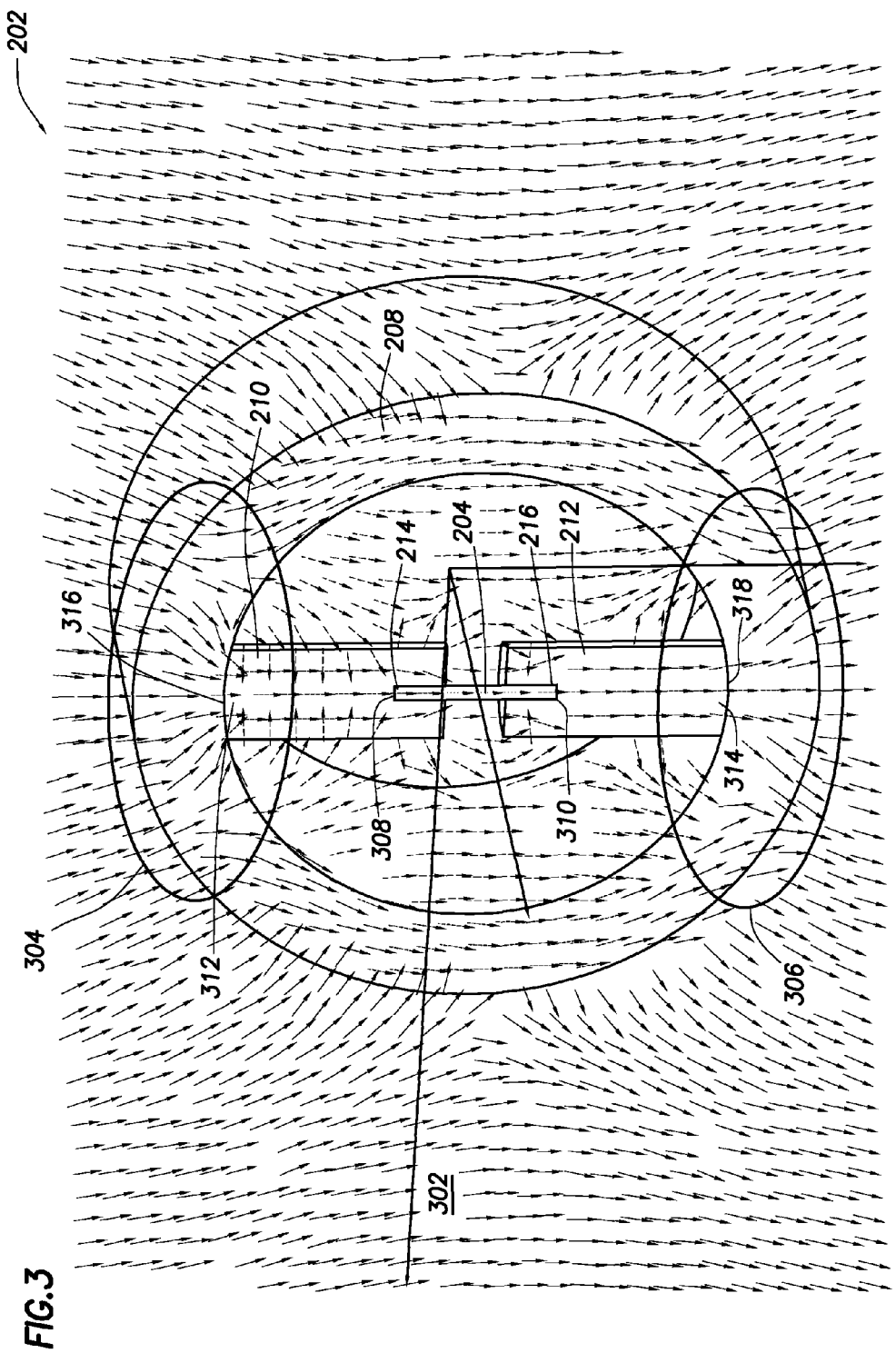
FIG. 3 illustrates an example of the magnetic flux concentrating capability of an example device that may implement embodiments of sensing the magnetic field of the Earth within a wellbore.

FIG. 3 shows a numerical simulation that illustrates the magnetic field concentrating effect of a downhole tool 202 employing a ferromagnetic cylindrical tubular member 208 in accordance with one or more embodiments. In this example, $B_{EARTH}$ is depicted as the largely downward pointing magnetic field 302. Due to the relatively high magnetic permeability of the magnetic cylindrical tubular member 208 (relative to the surrounding material), the $B_{EARTH}$ becomes distorted near the magnetic cylindrical tubular member 208, with the field preferentially taking the path of least magnetic resistance through the tool. Absent the magnetic flux concentrating blocks 210, 212, this distortion of $B_{EARTH}$ would result in the majority of the magnetic field 302 being effectively shunted, or short circuited, through the wall of the magnetic cylindrical tubular member 208, thereby almost entirely bypassing magnetic field sensor 204. However, in accordance with one or more embodiments, magnetic flux concentrating blocks 210, 212, formed from a high-permeability metal, serve to focus the magnetic field 302 into the sensor 204 as shown.

Thus, in accordance with one or more embodiments, magnetic flux concentrating block 210 serves to create magnetic flux concentrating region 304. In other words, magnetic field lines that would ordinarily have been shunted through the magnetic cylindrical tubular member 208 are redirected through the magnetic flux concentrating block 210 and into the sensor 204. Likewise, magnetic flux concentrating block 212 serves to create a corresponding magnetic field concentrating region 306. Region 306 corresponds to region 304 in the sense that the magnetic field lines that were directed into the sensor 204 by magnetic flux concentrating block 210 are further concentrated on the output side of the sensor by magnetic flux concentrating block 212, thus, reducing the detrimental magnetic field shunting effect of magnetic tubular member 208.

One of ordinary skill having the benefit of this disclosure will appreciate that the sensor 204, and magnetic flux concentrating blocks 210 and 212 need not be limited to the specific shapes shown. Rather, sensor 204, and magnetic flux concentrating blocks 210 and 212 may be formed of any suitable shape that may be able to accomplish the beneficial flux concentrating effect. A beneficial flux concentrating effect in the sensor 204 is obtained when the construction employs a continuous path made of elements of high-permeability metal including the sensor core 204. Furthermore, sensor 204 need not be elongated or cylindrical but may be made of a square shape, or may be whatever native shape required by the standard packages presently employed by various commercial manufactures of magnetic field sensors. Furthermore, one of ordinary skill will appreciate that magnetic flux concentrating blocks 210 and 212 need not be identical to each other and may be of different shapes and sizes, as long as the system provides the needed magnetic flux concentrating effect. For example, in accordance with one or more embodiments, either magnetic flux concentrating block 210 or 212 may be missing or reduced in size. Further, in accordance with one or more embodiments both, or one of, magnetic flux concentrating blocks 210 and 212 may further include several separate pieces that may be assembled or may allow for adjustment and or movement of the sensor and/or magnetic flux concentrating blocks within the magnetic tubular member 208. For example, magnetic flux concentrating block 212 may be formed of a split wedge configuration wherein one wedge may be laterally displaced relative to the other wedge thereby allowing for adjustment of the radial contact force between the sensor ends 214 and 216 and magnetic flux concentrating block ends 308 and 310, respectively. Similarly the split wedge configuration allows for adjustment of the radial contact force between the magnetic flux concentrating block ends 312 and 314 against the inner surfaces 316 and 318, respectively, of the magnetic tubular member 208.

This split wedge configuration of magnetic flux concentrating blocks 210 and 212 is described in further detail below in reference to FIGS. 4-6.

Figure 4:
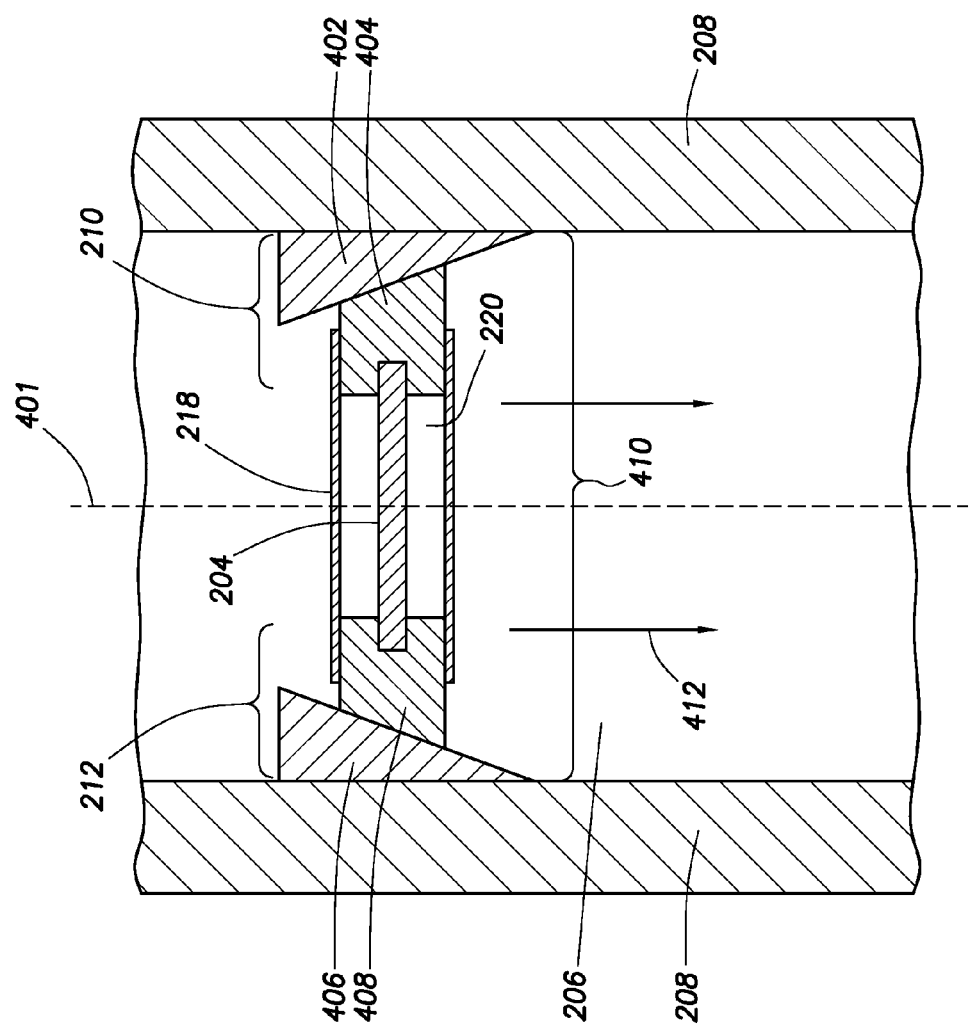
FIG. 4 illustrates various components of an example device that may implement embodiments of sensing the magnetic field of the Earth within a wellbore.

FIG. 4 shows a side view of a downhole tool capable of sensing $B_{EARTH}$ from within a wellbore in accordance with one or more embodiments. More specifically, the embodiment shown in FIG. 4 is similar to that previously discussed in reference to FIGS. 2-3 with the modification that the magnetic flux concentrating blocks 210 and 212 are each formed of a split wedge configuration. Accordingly, for the sake of clarity and conciseness, the detailed description of elements that were already described in detail in FIGS. 2-3 will not be duplicated here. FIG. 4 shows a magnetic sensor/block assembly 410 including magnetic sensor 204, magnetic flux concentrating blocks 210 and 212, and a sensor housing 218 in accordance with one or more embodiments. Further, in the embodiment shown in FIG. 4, the magnetic assembly is disposed within the internal bore 206 in a substantially radial direction, i.e., along a direction that is substantially perpendicular to the central axis 401 of cylindrical magnetic tubular. Furthermore one or more embodiments of the system may be employed as part of an MWD system or as part of a navigational system for directional drilling, in which case drilling mud 412 may flow downward, past the system toward the bit located further downhole.

In the embodiment shown in FIG. 4, magnetic flux concentrating block 210 includes a magnetic flux concentrating outer wedge block 402 and a magnetic flux concentrating inner wedge block 404. Likewise, magnetic flux concentrating block 212 includes magnetic flux concentrating outer wedge block 406 and magnetic flux concentrating inner wedge block 408. In accordance with one or more embodiments, magnetic flux concentrating outer wedge 402 and/or magnetic flux concentrating outer wedge 406 may be movable with respect to magnetic flux concentrating inner wedge blocks 404 and 408, respectively. For example, the relative movement of the inner and outer wedges may take place along a direction parallel to the central axis 401 of cylindrical tubular member 208. Accordingly, through the relative movement of the inner and outer wedges, the radial contact forces between the various parts of the sensor/block assembly 410 and the inner surface may be affected. Accordingly, any air gap present between the inner and outer wedges and/or between the outer wedges and the inner surfaces of the cylindrical tubular member 208 may also be affected. In accordance with one or more embodiments, the air gap between cylindrical tubular member 208 and wedge 402 may be minimized to ensure a substantially continuous radial (i.e., along the radial direction of the cylindrical tubular member 208) path for the magnetic field to pass through the magnetic material that forms the sensor/block assembly 410. One of ordinary skill having the benefit of this disclosure will recognize that it is the relative motion of the two magnetic flux concentrating wedge blocks that affects the radial contact force and, thus, the motion of either the inner or outer wedge is not limited to be along the central axis 401, but, rather, may be along any suitable direction.

In accordance with one or more embodiments, the flux concentrating effect of the sensor/block assembly 410 is maximized by minimizing the air gap between high-permeability metal components (e.g., magnetic flux concentrating blocks, magnetic flux concentrating wedges, magnetic flux concentrating plugs and/or sensor core). The minimal air gap is obtained by insuring good surface match between these components (good geometrical match) as well as by adjusting the radial contact force between the sensor/block assembly 410 and the cylindrical tubular member 208. Accordingly, the use of a sensor/block assembly 410 having the above distinguishing characteristics is not limited the measurement of $B_{EARTH}$ within a nonmagnetic tubular. Rather, the system may also accurately measure $B_{EARTH}$ within, or near to, a ferromagnetic tubular (e.g., ferromagnetic tool collars, ferromagnetic subs, ferromagnetic drill bit assemblies, or the like) without degradation in the measured signal. Thus, the system in accordance with one or more embodiments does not require a non-magnetic collar as the tubular member, nor does the system require a fixed amount of non-magnetic collar/pipe to be placed within the BHA on either side of the sensor to ensure proper functioning of the magnetic sensor.

Further, FIGS. 2, 4, and 5 (described in more detail below) show an implementation using one magnetometer following one diameter of the main tubular 208. However, embodiments of the present disclosure may employ more than one sensor positioned along other measurement axes. For example, in accordance with one or more embodiments, two similar radial constructions could be implemented with their measurement axes at 90 degrees from each other to support two perpendicular magnetic sensors at 90 degrees. These two radial sensors could be installed at a short distance from each other along the central system axis 401.

Figure 5:
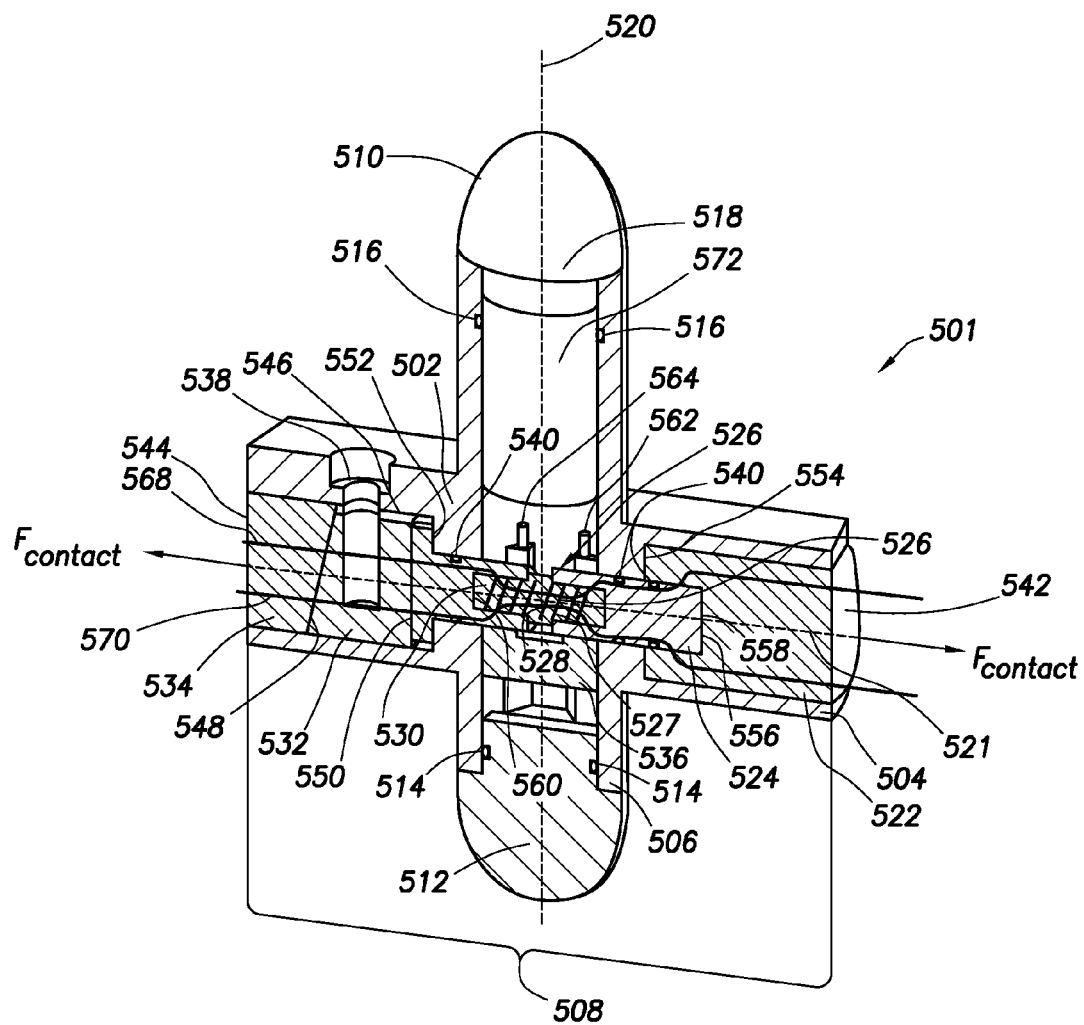
FIG. 5 illustrates various components of an example device that may implement embodiments of sensing the magnetic field of the Earth within a wellbore.

FIG. 5 shows an example of a side view of a magnetometer 501 for detecting $B_{EARTH}$ from within a borehole in accordance with one or more embodiments. The magnetometer includes a cross-shaped support housing 502 that includes an elongated radial portion 504 that intersects an elongated axial portion 506. Mounted at the intersection of the elongated axial portion 506, and the within radial portion 504, is a sensor/block assembly 508 whose configuration and operational principles are similar to the embodiments disclosed above in reference to FIGS. 2-4. The elongated axial portion further includes a high-side plug 510 and a low side plug 512, each having seals 514 and 516, respectively, for sealing the axial air chamber 518 of the cross-shaped support housing 502. Thus, in accordance with one or more embodiments, the axial air chamber 518 serves a purpose that is similar to the purpose of the internal chamber 220 described above in reference to FIGS. 2-4. For example, the axial air chamber 518 may be used isolate the magnetometer from borehole and/or drilling fluids. Furthermore, axial air chamber 518 may house a power source and electronics unit 572 operatively connected to the magnetometer and/or any other logging tools that may be used in conjunction with the magnetometer. Furthermore, in accordance with one or more embodiments, when the magnetometer is employed in conjunction with a downhole tool (not shown), i.e., when mounted within a cylindrically shaped tubular such as a drill collar, the elongated axial portion 506 aligns substantially parallel with the central axis 520 of the tubular and the radial portion 504 may be disposed substantially perpendicular to the axial portion, i.e., substantially parallel to the radial axis 521 of the cylindrically shaped tubular.

In accordance with one or more embodiments, the sensor/block assembly 508 includes magnetic flux concentrating block 522, magnetic flux concentrating plug 524, sensor 526 having an optional sensor core 528, magnetic flux concentrating plug 530, magnetic flux concentrating inner wedge block 532, magnetic flux concentrating outer wedge block 534, and electrical interconnect block 536. In accordance with one or more embodiments, a flux gate magnetometer may be employed as the sensor 526. With a flux-gate magnetometer, the sensing is performed by measuring the output signal from a coil 527 wrapped around the sensor core 528. For a high-accuracy flux gate magnetometer, two cylindrical high-permeability metal cores 528 should be used, allowing differential measurements performed by the associated electronics of the flux gate magnetometer: such an implementation may include 3 windings (one per sensor core in addition to one around the pair of cores). For a simplified construction, a single core allows for measurements of the tool face having an accuracy of about 1 degree.

In accordance with one or more embodiments, an activation system (not shown) may be mounted within access hole 538 of inner magnetic flux concentrating wedge block 532. The activation mechanism includes either a screw or a spring system installed in access hole 538. This system creates a force along the axis of the activation mechanism, forcing the magnetic flux concentrating wedge block 534 to be displaced along the axis 521, thereby minimizing the air-gaps between the high permeability metal blocks. Accordingly, flux concentration in the sensor core 528 is achieved. Furthermore, in accordance with one or more embodiments, the activation system may be mounted within magnetic flux concentrating wedge block 534 or within any other suitable magnetic flux concentrating block available within the sensor/block assembly 508 that would allow for the radial adjustment of the position of the magnetic flux concentrating blocks. Furthermore, the magnetic plugs 530 and 524 are sealed against the inner surface of the radial portion 504 of the cross-shaped housing 502 by seals 540. Power may be provided to the sensor 526, by electronics unit 572 via a battery located in electronics unit 572. With flux gate type detection, the sensor 526 comprises coil 527 that may be wrapped around the sensor core 528. Furthermore, coil 527 is electrically connected to electronics unit 572. In addition data may be exchanged to and from the magnetic sensor 526 by way of terminals 562 and 564 or other terminals (not shown) located on electrical interconnect block 536. One of ordinary skill will appreciate that the electronics unit 572 may include any digital or analog electronics/circuitry known in the art to power, control, collect, store, and process data received from a magnetometer.

Figure 7:
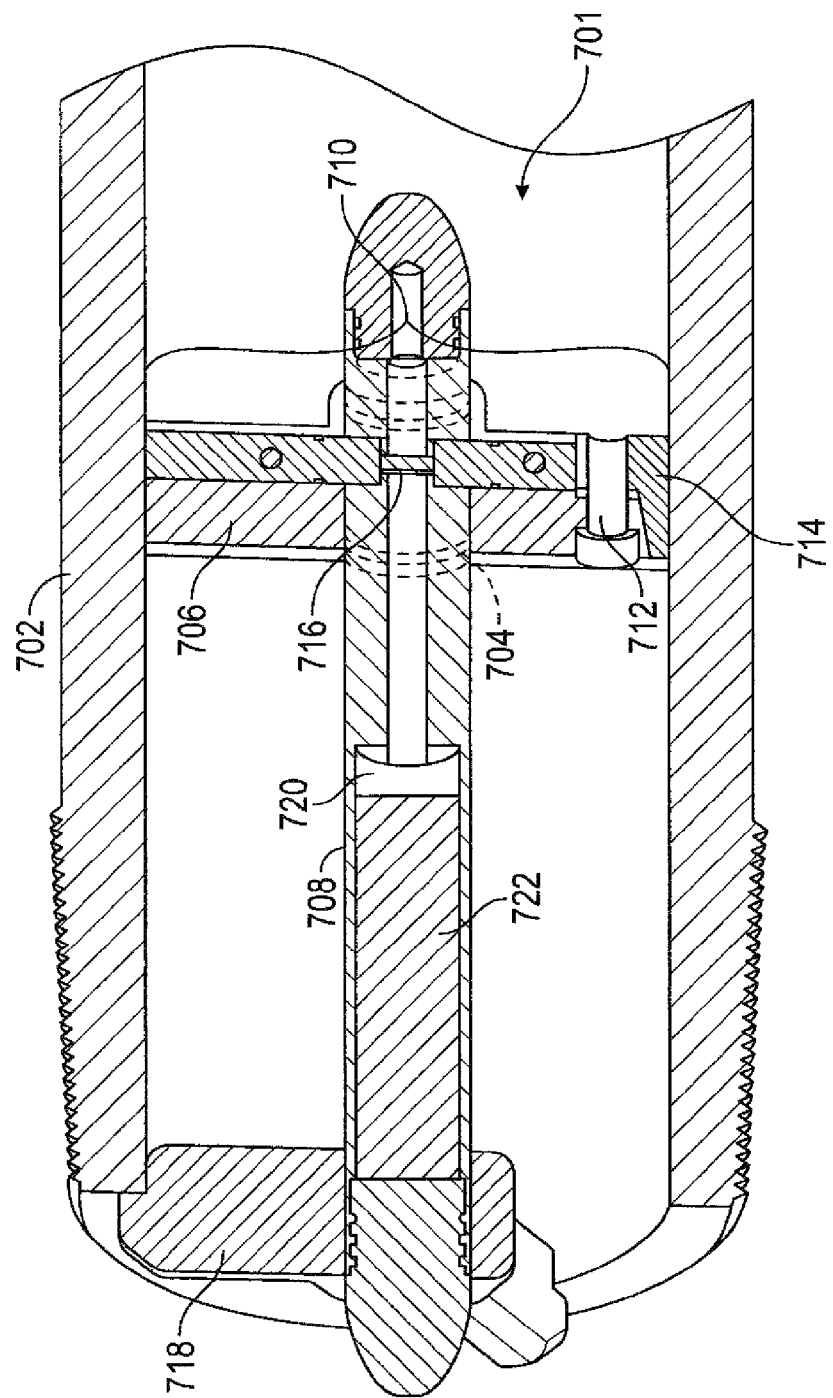
FIG. 7 illustrates various components of an example device that may implement embodiments of sensing the magnetic field of the Earth within a wellbore.

During operation, magnetic flux concentrating block 522 and magnetic flux concentrating wedge 534 are pushed radially against the inner wall of a cylindrical tubular member (not shown) inside which the cross-shaped support housing 502 is disposed. A simplified example of a cross-shaped support housing mounted within a cylindrical tubular member is illustrated in FIG. 7. Accordingly, magnetic flux concentrating block 522 and magnetic flux concentrating wedge block 534 exert radially opposing contact forces to hold the cross-shaped housing 502 in place by way of frictional contact between contact surfaces 542 and 544 and the inner surface of the cylindrical tubular member (not shown).

In accordance with one or more embodiments, the contact forces from surface 544 and 542 may be controlled by the activation system 538 in the following way. Activation system 538 translates magnetic flux concentrating inner wedge block 532 within inner bore 546 of the lower section of elongated radial portion 504. As a result of the translation of magnetic flux concentrating inner wedge block 532, magnetic flux concentrating wedge block 534 may be moved inward or outward along the radial direction 521. Once contact is made between the contact surface 544 and the inner surface of the cylindrically shaped housing, the contact force $F_{contact}$ is transmitted across the following contact surfaces: the contact surface 548 between magnetic flux concentrating outer wedge block 534 and magnetic flux concentrating inner wedge block 532; the contact surface 550 between magnetic flux concentrating plug 530 and magnetic flux concentrating inner wedge block 532; the contact surface 552 between the cross-shaped support housing 502 and magnetic flux concentrating plug 530; the contact surface 554 between the cross-shaped support housing 502 and the magnetic flux concentrating block 522; and the contact surface 542 between the magnetic flux concentrating block 522 and the inner surface of the cylindrical tubular member. Furthermore, in accordance with one or more embodiments, air gaps 556, 558, and 560 ensure that the sensor 526 and sensor core 528 are not subjected to any undue compressive strain induced by $F_{contact}$ that could possibly result in damage to the sensor 526 and/or core 528.

In accordance with one or more embodiments, air gaps 556, 558, and 560 do not substantially reduce the magnetic flux concentrating effect of the sensor/block assembly 508 because a substantially continuous radial flux path is maintained by way of cylindrical overlaps between magnetic flux concentrating block 522 and magnetic flux concentrating plug 524; by magnetic flux concentrating plug 524 and the upper end of sensor core 528; the lower end of sensor core 528 and magnetic flux concentrating plug 530; the direct contact between magnetic flux concentrating plug 530 and magnetic flux concentrating inner wedge block 532; and the direct contact between magnetic flux concentrating inner wedge block 532 and magnetic flux concentrating outer wedge 534. In other words, the pieces of the sensor/block assembly 508 that include air gaps also have cylindrical contact surfaces, and, thus, serve as either cylindrical plugs (sensor core 528), as both cylindrical plugs and caps (plugs 524 and 530), or as a cylindrical cap (block 522). Accordingly, magnetic field lines may travel along nearly continuous flux paths 568 and 570. Accordingly, flux concentration is achieved in comparison to a system not employing magnetic blocks (i.e., flux concentrators).

Figure 6:
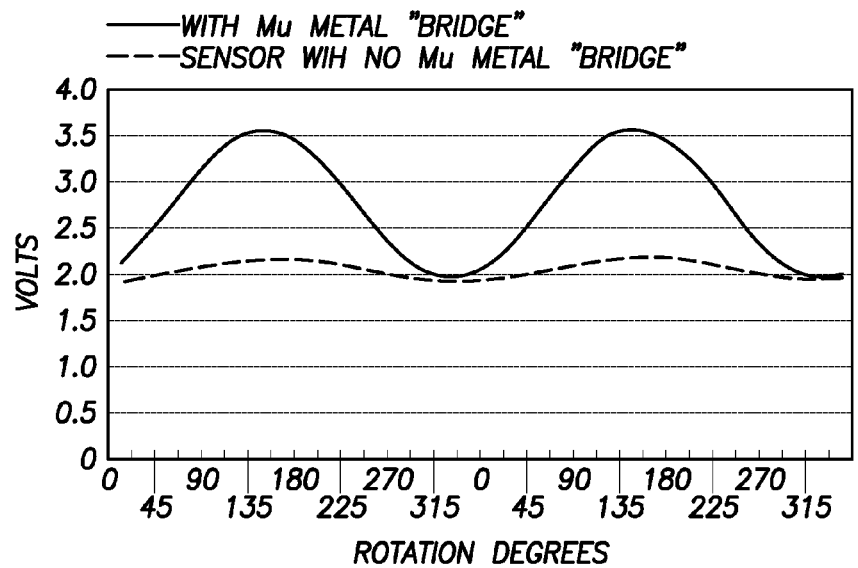
FIG. 6 is a chart of magnetic sensor output signal as a function of angular position of a magnetometer in accordance with one or more embodiments.

FIG. 6 illustrates an example of the improvement in signal for a system employing magnetic flux concentrating blocks in accordance with one or more embodiments. Specifically, FIG. 6 shows a chart of magnetic sensor output as a function of sensor angle for systems mounted within a magnetic tubular member. The dashed line indicates that the $B_{EARTH}$ is reduced within the inner bore of the magnetic tubular. However, when magnetic flux concentrating blocks are employed (in this case, the magnetic flux concentrating blocks are formed from Mu-metal), a nearly continuous high permeability radial flux path is created that directs the magnetic flux into the sensor. As a result, the amplitude of the measured Earth flux is increased. Accordingly, the system in accordance with one or more embodiments may be employed within a standard low cost ferromagnetic tubular. One of ordinary skill will appreciate that the precise amount of improvement may depend on many factors including tubular permeability, magnetic flux concentrating block permeability, sensor core permeability in addition to many geometric factors such as the arrangement of the core and magnetic flux concentrating blocks relative to the tubular.

FIG. 7 shows a magnetometer assembly that may be employed as part of a downhole tool (e.g., as part of a BHA for a directional drilling tool or MWD tool) in accordance with one or more embodiments. The magnetometer assembly 701 is mounted within a cylindrically shaped tubular member 702. In accordance with one or more embodiments, the cylindrically shaped tubular member 702 may be a magnetic or nonmagnetic drill collar for use in a downhole tool. For example, the magnetometer assembly 701 may be part of a tool used for determining the angular position of the tubular relative to the prevailing direction of the Earth's magnetic field (e.g., magnetic North). Similar to the system shown in FIG. 5, the system in FIG. 7 includes a magnetometer disposed within a cross-shaped support housing 704 including an elongated radial portion 706 that intersects an elongated axial portion 708. Mounted within the elongated axial portion is a sensor/block assembly 710 that includes sensor 716 and whose configuration and operational principles are similar to the embodiments disclosed above in reference to FIGS. 3-5. Similar to the embodiment shown in FIG. 5, the activation system 712 couples to a magnetic flux concentrating wedge block 714. Furthermore, in this embodiment, the uphole end of the elongated axial portion 708 is supported by supporting element 718. The internal bore 720 of elongated axial portion 708 may contain electronics unit 722. One of ordinary skill will appreciate that the electronics unit 722 may include a battery and any digital or analog electronics/circuitry known in the art to power, control, collect, store, and process data received from a magnetometer.

In accordance with one or more embodiments, the magnetic material used to form any of the magnetic flux concentrating blocks, magnetic flux concentrating plugs, sensor core, and/or magnetic flux concentrating wedge blocks may be a high permeability material (high-$\mu$ material). As used herein, permeability $\mu$ is defined to be the relative permeability, i.e., $\mu = \mu_{material}/\mu_0$, where $\mu_0$ is permeability of free space and $\mu_{material}$ is the absolute magnetic permeability of the material. As used herein, a high permeability material is defined as a material having a magnetic permeability $\mu$ that is larger than that of a steel drill collar having $\mu \approx 100$. Furthermore, a magnetic flux concentrating block in accordance with one or more embodiments will increase (or concentrate) the magnetic flux entering a magnetic field sensor relative to the amount of magnetic flux that would have entered the magnetic field sensor without the addition of the block. More generally, the magnetic flux concentrating blocks, magnetic flux concentrating plugs, sensor core, and/or magnetic flux concentrating wedge blocks may be made of any material having at $\mu$ larger than the $\mu$ of the cylindrical tubular member used to house the magnetometer. For example, common high-$\mu$ materials include Metglass ($\mu=1,000,000$); Nanoperm ($\mu=80,000$); Mu-metal ($\mu=20,000-50,000$); ferrite ($\mu=16-640$).

Figure 8:
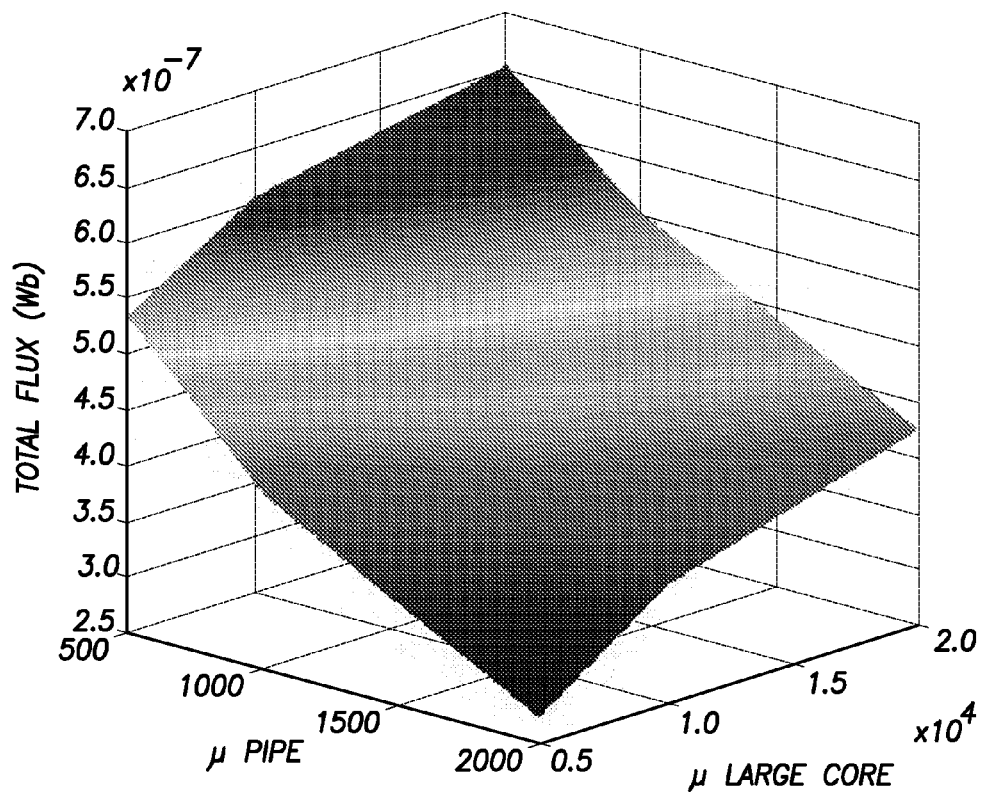
FIG. 8 is a chart that plots measured flux as a function of tubular magnetic permeability and sensor core permeability in accordance with one or more embodiments.

One of ordinary skill in the art will appreciate that the precise choice of high-$\mu$ material will depend on many factors, including the type of magnetic sensor used, the geometry/shape of the magnetic flux concentrating blocks, magnetic flux concentrating plugs, etc. and the size, shape and type of material used for the tubular member. For example, in a downhole application using a drill collar formed from magnetic (e.g., ferromagnetic) steel, Mu-metal may be chosen as the high-$\mu$ material for the sensor/block assembly. However, one of ordinary skill will appreciate that many different types of material may be chosen and, furthermore, different parts of the sensor/block assembly may be made from different materials. For example, in certain situations, the sensor core formed from high-$\mu$ material such as Mu-metal will provide enough flux concentration to allow for the other components of the sensor/block assembly to be made from standard magnetic or nonmagnetic materials used in the oilfield industry. In other situations, the sensor core may be made of ferrite or another more common magnetic material, and the magnetic flux concentrating blocks, magnetic flux concentrating plugs, and/or magnetic flux concentrating wedge blocks may be made of a high-$\mu$ material such as Mu-metal, or the like. Further, in other situations that employ a cylindrical tubular member that is made from a non magnetic material, e.g., chrome-manganese, low carbon austenitic alloys ($\mu=1$), or the like, the sensor/block assembly may be composed solely of magnetic steel. FIG. 8 shows a plot of numerically computed magnetic flux in the center of the sensor core as a function of both the permittivity of the cylindrical tubular member and the sensor core to further illustrate the magnetic flux concentration concept in accordance with one or more embodiments.

FIGS. 9A-9E illustrate various components of an example device that may implement embodiments of sensing $B_{EARTH}$ within a wellbore, using local magnetic flux concentration. With such local flux concentration, the measurement is possible inside ferromagnetic and nonmagnetic tubulars. In accordance with one or more embodiments, one or more magnetic sensors 903, 905 may be mounted within a cylindrical tubular member 907. In accordance with one or more embodiments, the cylindrical tubular member may include drill bit 909 and sub 911. Furthermore, magnetic sensors 903 and 905 may be mounted within tool 913 designed to log measurements related to drilling dynamics. In accordance with one or more embodiments, the housing of the dynamic drilling logging tool 913 is formed of a substantially tubular sensor housing 915 having an internal bore (not shown) formed therethrough. In accordance with one or more embodiments, the sensor housing 915 may be formed of any material known in the art, for example, from a non-magnetic steel alloy, or the like. Furthermore, mounted within upper portion 917 of the internal bore of sensor housing 915 is logging sensor unit 921 and mounted within the lower portion 919 is a battery for powering logging sensor unit 921. In accordance with one or more embodiments, logging sensor unit may include several different types of sensors, such as accelerometers, gravitometers, magnetic field sensors, etc., and electronics that may be used for logging of dynamic data. For example, in accordance with one or more embodiments, logging sensor unit 921 includes at least one magnetic field sensor 903 mounted thereon. In addition, magnetic flux concentrating blocks 925 and 927 may be mounted proximate to sensor 903 in order to direct the sensed magnetic field into the sensor 903. One of ordinary skill having the benefit of this disclosure will appreciate that magnetic flux concentrating blocks 925 and 927 serve a function that is similar to the magnetic flux concentrating blocks described above with respect to FIGS. 3-7, i.e., they serve to provide a high permeability radial path for magnetic flux to follow, thus, directing more magnetic flux into the magnetic sensors along measurement axis 929. In accordance with one or more embodiments, a second magnetic sensor 905 having magnetic flux concentrating blocks 935 and 937, is mounted within logging sensor unit 921. The second magnetic sensor 905 may be mounted so as to have a measurement axis 931 that is disposed along a substantially perpendicular direction to measurement axis 929. Magnetic flux concentrating blocks 937 and 935 increase the magnetic flux inside the sensor 905.

One of ordinary skill having the benefit of this disclosure will appreciate that any number of sensors mounted at any number of different angles may be used without departing from the scope of the present disclosure. For example, as shown in FIGS. 9C and 9E, two magnetic sensors having measurement axes mounted at 90 degrees allows for the determination of the angular position of the logging sensor unit 921 and also direction of rotation because of the fact that the signals of the two sensors are phase shifted (by $\pi/2$ for two sensors at 90 degrees). One of ordinary skill will also appreciate that rotational velocity and acceleration may also be computed by taking the first or second derivative, respectively of the angular position signal.

Figure 10:
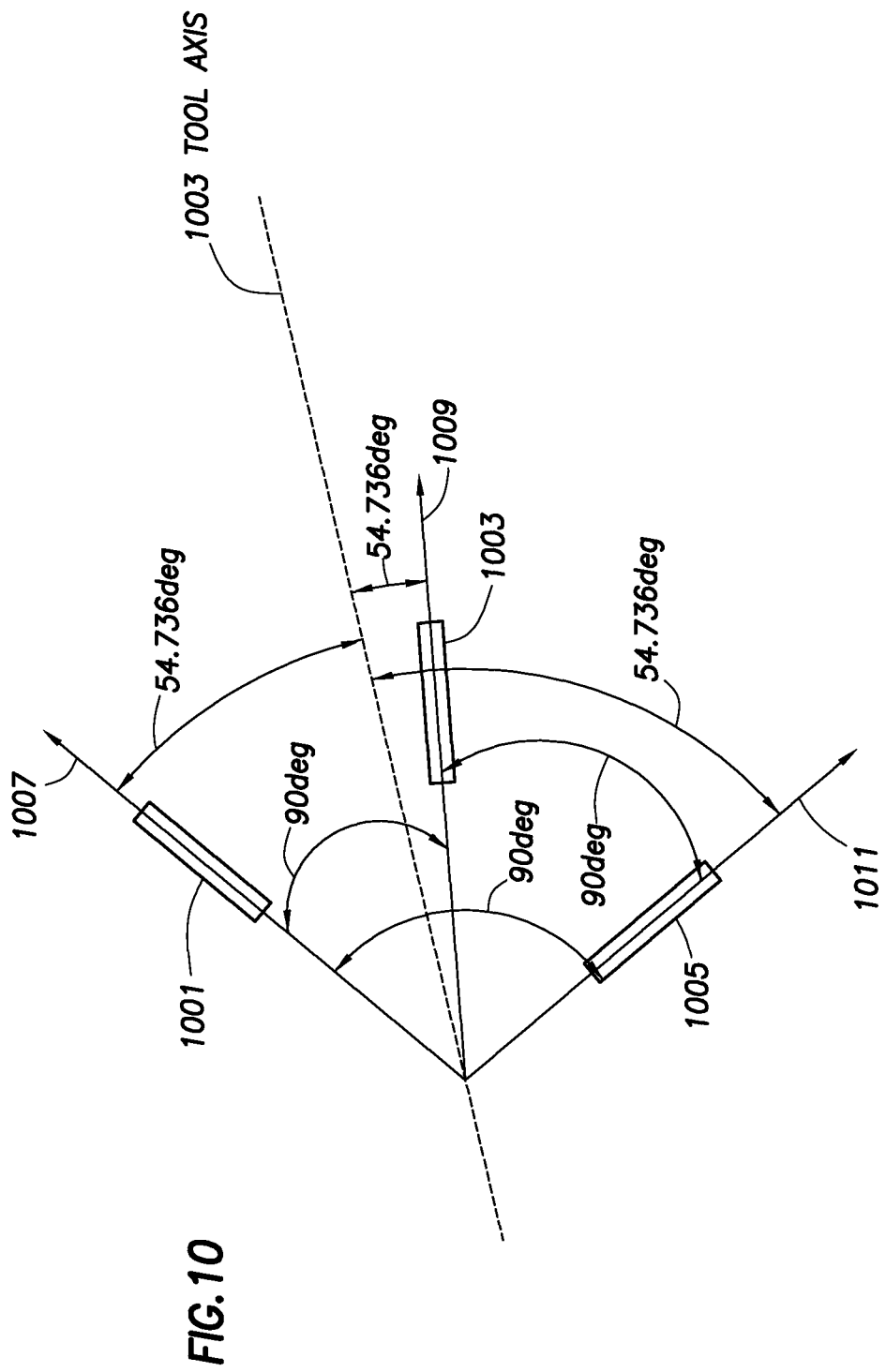
FIG. 10 illustrates an arrangement of magnetic field sensors that may be employed to implement embodiments of sensing the magnetic field of the Earth within a wellbore.

Furthermore, in accordance with one or more embodiments, three magnetic field sensors may be used to allow for the positioning of the device along two different angles with respect to $B_{EARTH}$. For example, FIG. 10 shows a system in accordance with one or more embodiments wherein three magnetic sensors 1001, 1003, and 1005 are employed, having measurement axes 1007, 1009, and 1011, respectively. According to this embodiment, the three measurement axes 1007, 1009, and 1011 are mounted within the tool so that axes 1007, 1009, and 1011 are mutually orthogonal (i.e., the three axes form an x,y,z coordinate system). Furthermore, the three sensors 1001, 1003, and 1005 may be mounted within the tool such that each the angle between each sensor and the central axis 1013 of the tool is the same. e.g., 54.736 degrees. However, one of ordinary skill in the art having the benefit of this disclosure will appreciate that other angles between the measurement axes are possible without departing from the scope of the present disclosure. Furthermore, one of ordinary skill in the art having the benefit of this disclosure will also appreciate that other angles between the measurement axes and the tool axis are possible without departing from the scope of the present disclosure. In addition, in accordance with one or more embodiments, each sensor may employ flux concentrating blocks (not shown) as described above in reference to FIGS. 2-9. Furthermore, each sensor 1001, 1003, 1005 may be equipped with magnetic flux concentrating blocks in a manner equivalent to sensors 903 and 905 described above in reference to FIG. 9, above. Accordingly, this configuration of sensors (angular orientation and usage of concentrators) allows for improved detection of the magnetic flux when the tubular (208 or correspondingly 911) is ferromagnetic.

Figure 11:
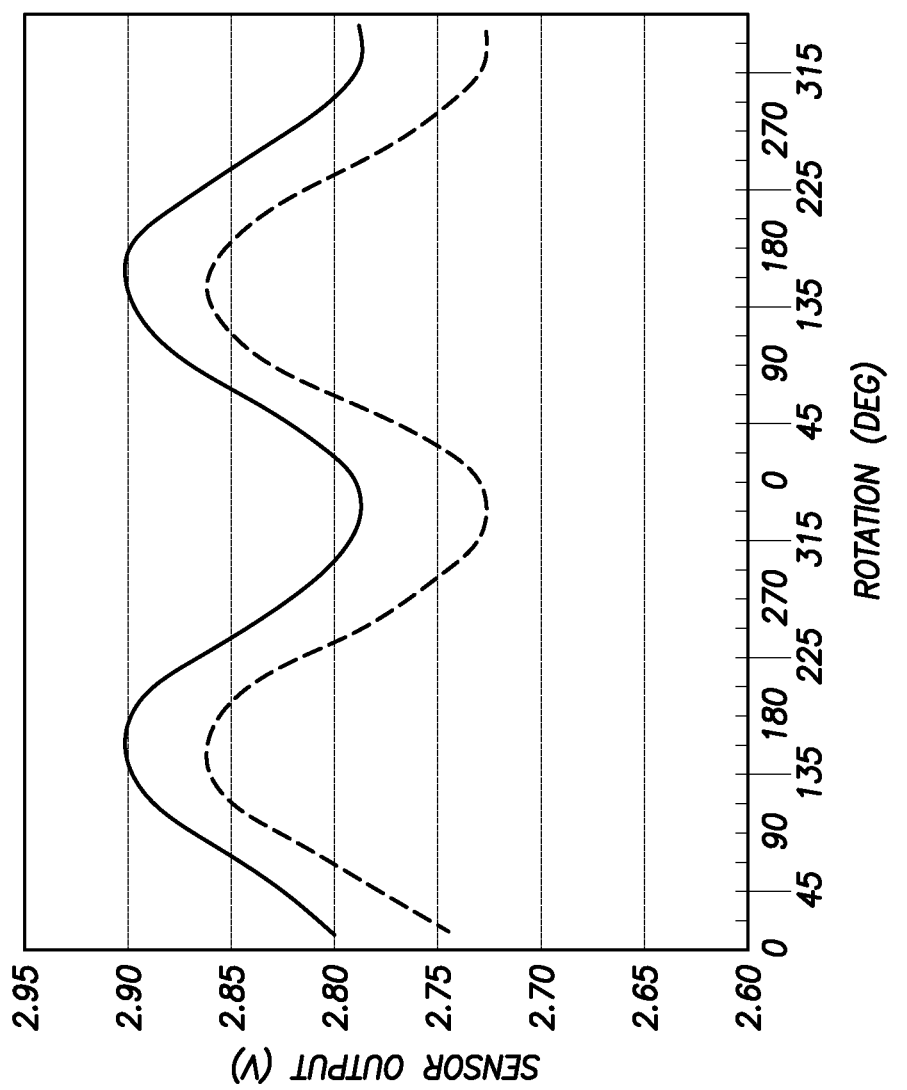
FIG. 11 is a chart of magnetic sensor output signal as a function of angular position of a magnetometer in accordance with one or more embodiments.

FIG. 11 is a chart of magnetic sensor output signal as a function of angular position for a single magnetic sensor mounted within a magnetized tubular in accordance with one or more embodiments. As discussed above, employing a magnetic sensor with either flux concentrating blocks, e.g., the embodiments shown in FIG. 9-10 or employing a nearly continuous radial magnetic flux path through the tool, e.g., the embodiments shown in FIG. 2-7, allows for the magnetic sensors to be part of a logging tool that may be mounted within standard tubulars made of magnetic material (e.g., ferromagnetic steel). Accordingly, in accordance with one or more embodiments, the system does not require expensive non-magnetic tubulars, although one of ordinary skill will appreciate that the embodiments disclosed herein may just as well be employed in non-magnetic tubulars without departing from the scope of the present disclosure.

As shown in FIG. 11, sensors mounted within magnetic tubulars will measure not just flux from the Earth's magnetic field, but may also measure the magnetic flux from the magnetization of the tubular itself. Accordingly, as the system is rotated with respect to $B_{EARTH}$, the oscillating (ideally sinusoidal) signal due to the rotation of the sensor within the fixed field of the Earth is modified by the addition of a constant, DC, or slowly varying, offset signal that represents the residual tubular magnetization. The tubular magnetization signal does not vary with the rotation of the tubular because the relative orientation of the sensor with respect to the prevailing direction of the tubular magnetization is fixed as a result of the sensor being fixedly attached within the tubular. As used herein, the term slowly varying signal is understood to mean a signal that varies on a timescale that is long compared to the rotational period of the tool. For example, the magnetization of the magnetic tubular may slowly fluctuate as the temperature of the tubular changes due to changing external conditions in the wellbore or with repeated vibrations and shocks. Accordingly, in accordance with one or more embodiments, additional down-hole signal processing may be performed on the sensor output signal to remove the offset signal from the sensor output signal.

In FIG. 11, the dashed line represents the output signal from a magnetic field sensor that is mounted within a non-magnetic tubular in accordance with one or more embodiments. In addition, the solid line shown in FIG. 11 represents the output signal from a magnetic field sensor that is mounted within a magnetic tubular. Accordingly, the solid line not only includes the oscillatory signal from the rotation of the sensor within $B_{EARTH}$ but also includes a DC (or slowly varying) offset signal, the source of which is the residual magnetization of the tubular itself.

As detailed above, the magnetization of the ferromagnetic tubular may induce a constant offset signal that may be compensated for. Furthermore, a sudden change in the constant offset signal indicates that the magnetometer system has been rotated suddenly inside the magnetized tubular which may occur, for example, when the attachment system of the magnetometer suddenly slips in response to a violent torsional acceleration. In accordance with one or more embodiments, when two radial magnetometers are available in the system, if the logging tool has experienced such a sudden rotation within the magnetized tubular, the two sensors will need correction of their individual offsets. From the knowledge of the final offset and using either an initial calibration and/or a model, it is possible to estimate the angle that the logging device has been rotated in the tubular. In what follows, a method for compensating for the constant offset signal that occurs as a result of the magnetization of the ferromagnetic tubular.

Figure 12:
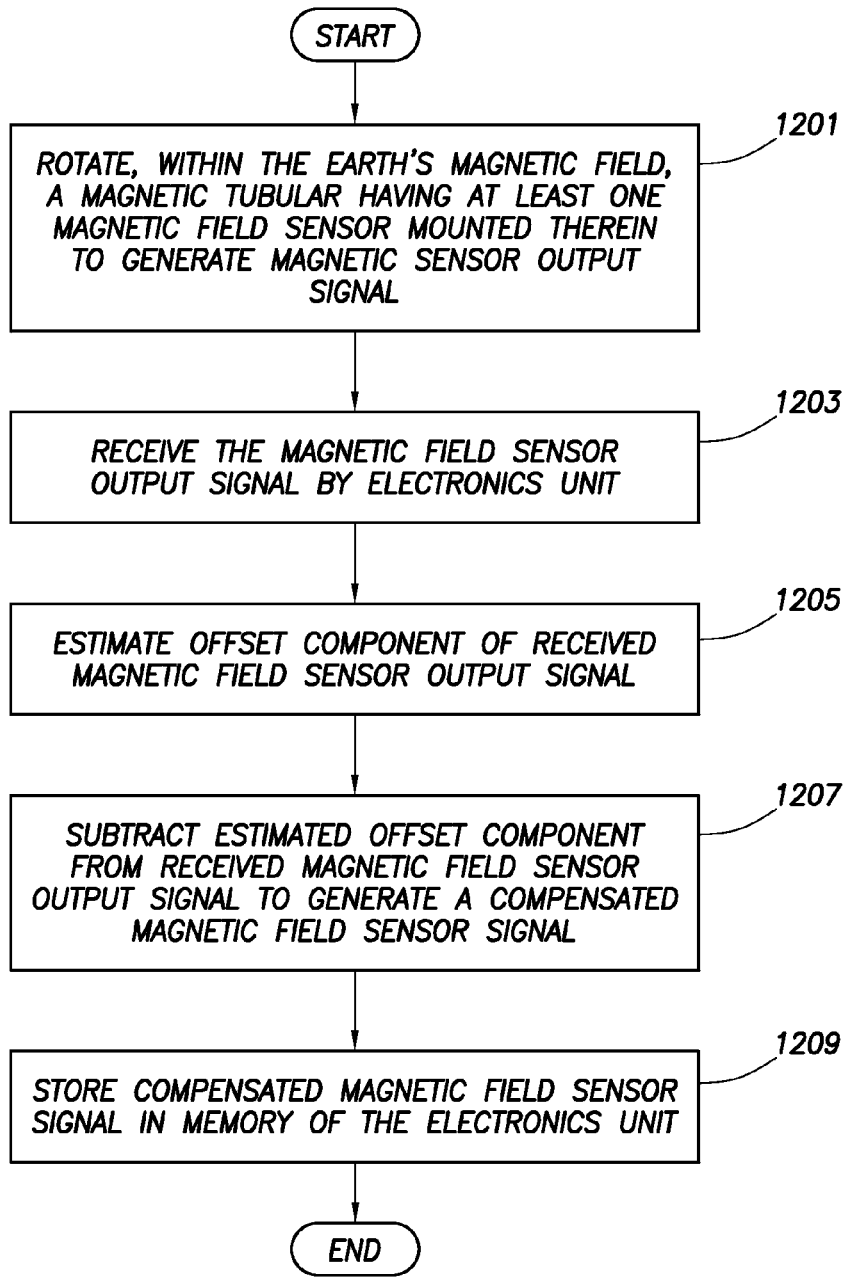
FIG. 12 is a flow chart that illustrates a method in accordance with one or more embodiments.

FIG. 12 shows a flow chart illustrating a method in accordance with one or more embodiments. More specifically, FIG. 12 illustrates a method for compensating an output signal for the effect of tubular magnetization in accordance with one or more embodiments. In 1201, the system in which one or more embodiments of sensing $B_{EARTH}$ within a wellbore may be implemented is rotated within $B_{EARTH}$ in order to generate an output signal. In accordance with one or more embodiments, the system may be a magnetic field sensor mounted within a magnetic tubular as described above in reference to FIGS. 2-11. Accordingly, as the system is rotated in $B_{EARTH}$, an output signal is generated by the magnetic field sensor. The output signal will have an oscillatory part that corresponds to a measurement of the magnetic flux due to $B_{EARTH}$ and an offset component that corresponds to the magnetic flux generated from the magnetized magnetic tubular, as shown, e.g., in FIG. 11.

In 1203, the generated magnetic field sensor output signal is received by an electronics unit. The electronics unit may include the necessary digital and/or analog electronics necessary to operate the magnetic sensor. For example, the electronics unit may include a battery to power the sensor or sensors and any peripheral analog or digital electronics associated with the electronics unit. In addition, the electronics unit may include a processor for performing computations on the received magnetic field sensor output signal and/or an analog to digital converter (ADC) for converting the magnetic field sensor output to a digital signal to be processed by the processor. In addition, analog circuitry may be included in the electronics unit to allow for analog signal processing of the raw received magnetic field sensor output (i.e., before output from any analog to digital converter.)

In 1205, the electronics unit performs the necessary processing to estimate the offset component of the received magnetic field sensor output signal. For example, the received magnetic field sensor output signal may be averaged over one or more cycles to determine the offset component. Furthermore, the signal may be AC coupled by way of analog circuitry in the electronics unit. One of ordinary skill will appreciate that the offset component may be estimated in a number of different ways using known techniques of analog or digital signal processing.

In 1207, the estimated offset component is subtracted from the received magnetic field sensor output signal to generate a compensated magnetic field sensor signal. Thus, the compensated magnetic field sensor signal has the offset component substantially removed thereby decoupling the received magnetic field sensor output signal from the magnetization of the magnetic tubular. Accordingly, an angular position measurement made using the sensor is substantially independent of the magnetization of the magnetic tubular and, thus, of improved accuracy as compared to an uncompensated signal.

One of ordinary skill having the benefit of this disclosure will appreciate that the signal processing described above may be accomplished using analog circuitry, digital circuitry, or a combination of analog circuitry and digital circuitry. For example, the offset component may be estimated as an average over one rotation of the magnetic field sensor or, since the rotational speed is often not constant, the offset component may be determined as an average over a long interval that includes several rotations, thereby, removing the need to synchronize the data acquisition and processing to the rotation of the tool/sensor. Furthermore, the offset component may be removed from the received magnetic field sensor output signal either before or after ADC processing. For example, if the offset component exceeds the total number of bits available in the ADC, the offset component may be removed prior to ADC processing. In this case, the signal compensation (subtraction) may be accomplished by injecting a DC signal into an amplifier section that receives the magnetic field sensor output signal. The injected DC signal will depend on the value of the offset component and may be defined, for example, by the processor to insure that the average value of the compensated magnetic filed sensor signal is a fixed value, e.g., zero. In accordance with one or more embodiments, the processor may generate this signal via a digital to analog converter (DAC).

Figure 13:
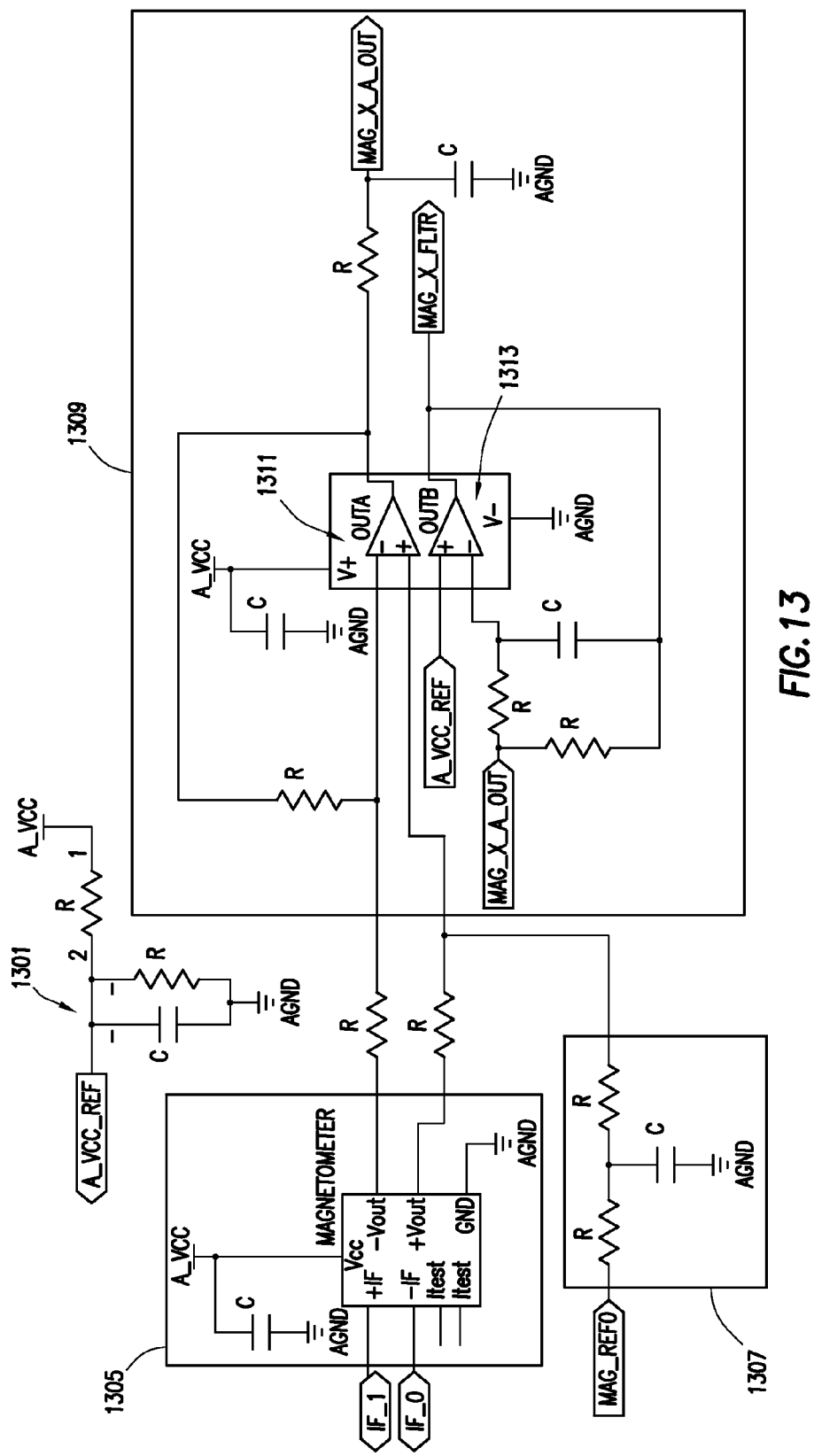
FIG. 13 illustrates various components of an example device that may implement embodiments of sensing the magnetic field of the Earth within a wellbore.

FIG. 13 shows one example of analog circuitry that may be used to perform the magnetic field sensor compensation. One of ordinary skill will appreciate that many different methods may be used and according to standard techniques of analog and digital circuitry. The implementation shown in FIG. 13 includes amplifier reference voltage 1301, magnetic sensor 1305, magnetization offset input circuit 1307, and filter and amplifier circuit 1309. Filter and amplifier circuit 1309 further includes single ended differential amplifier 1311 which is configured to receive the raw magnetic field sensor output signal from magnetic sensor 1305 and to receive the compensation signal from magnetization offset input circuit 1307. Single ended differential amplifier 1311 performs a differential amplification and magnetization offset compensation to produce a compensated magnetic field sensor signal MAG_X_A_OUT. MAG_X_A_OUT may then be input to a filter for further processing. In accordance with one or more embodiments, a 2-pole Chebyshev multi-feedback low pass filter 1313 may be used to produce a filtered compensated magnetometer signal MAG_X_FLTR.

Returning to FIG. 12, in 1209, the compensated (and possibly filtered) magnetic field sensor signal is stored in memory that is located within, or external to, the electronics unit. When the system is deployed as a dynamic drilling logger, the data may be stored in memory located within the electronics unit and then transferred to a secondary system for analysis after the logging tool is removed from the borehole. Alternatively, the data representing the compensated signal may be stored downhole in memory and/or transmitted to the surface via mud pulse or Emag telemetry. For example, real time magnetometer data may, thus, be used during a MWD operation.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A downhole magnetic field sensing tool comprising:
    a rotatable cylindrical tubular member having an internal bore formed therethrough;
    a first magnetic field sensor having a first measurement axis, a second magnetic field sensor having a second measurement axis and a third magnetic field sensor having a third measurement axis, each magnetic field sensor disposed within the internal bore of the rotatable cylindrical tubular member, wherein the first measurement axis, the second measurement axis, and the third measurement axis each makes an angle with a central axis of the rotatable cylindrical tubular member and the first measurement axis is arranged at a non-zero angle relative to the second measurement axis, each magnetic field sensor employing a magnetically permeable core, the magnetically permeable core having a first axial end and a second axial end;
    a first magnetic flux concentrating block and a second magnetic flux concentrating block wherein the first magnetic flux concentrating block is disposed within the internal bore at the first axial end of the magnetically permeable core of each magnetic field sensor, and the second magnetic flux concentrating block is disposed within the internal bore at the second axial end of the magnetically permeable core of each magnetic field sensor; and
    an electronics unit operatively and communicatively connected to each magnetic field sensor.

2. The tool of claim 1, wherein the first measurement axis, the second measurement axis, and the third measurement axis are mutually orthogonal axes and configured to track an angular position of the rotatable cylindrical tubular member.

3. The tool of claim 1, wherein the angles are substantially equal to each other.

4. The tool of claim 1, wherein the rotatable cylindrical tubular member is made of one selected from the group consisting of a ferromagnetic material and a magnetic material.

5. The tool of claim 1, wherein a magnetic permeability of the cylindrical tubular member is less than a magnetic permeability of the magnetic flux concentrating block.

6. The tool of claim 1, wherein the magnetic flux concentrating blocks are formed from a material having a magnetic permeability of 100 or greater.

7. The tool of claim 1, wherein the magnetic flux concentrating blocks are formed from a material having a magnetic permeability of 1,000 or greater.

8. A downhole magnetic field sensing tool comprising:
a cylindrical tubular member having an internal bore formed therethrough;
at least one flux gate magnetic field sensor employing a magnetically permeable core, the magnetically permeable core having a first axial end and a second axial end, the sensor disposed within the internal bore of the cylindrical tubular member;
a first magnetic flux concentrating block and a second magnetic flux concentrating block, the first magnetic flux concentrating block disposed within the internal bore proximate to the first axial end, the second magnetic flux concentrating block disposed within the internal bore proximate to the second axial end of the magnetically permeable core, wherein the first magnetic flux concentrating block is configured to create a magnetic flux concentrating region and the second magnetic flux concentrating block is configured to create a corresponding magnetic field concentrating region;
an electronics unit, operatively and communicatively connected to the at least one magnetic field sensor, wherein the electronics unit is configured to receive a signal from the at least one magnetic field sensor
wherein the magnetic flux concentrating block comprises:
a magnetic flux concentrating plug;
a magnetic flux concentrating wedge shaped block; and
an activation system, which, when activated, translates a position of the magnetic flux concentrating wedge shaped block relative to the magnetic flux concentrating plug in order to change radial contact force against the inner surface of the cylindrical tubular member.

9. The tool of claim 8, wherein the activation system comprises one selected from the group consisting of a spring, a screw, and a piston.

10. A magnetometer comprising:
a rotatable cylindrical tubular member having an internal bore formed therethrough, the tubular member being fabricated from a magnetic material;
a first magnetic field sensor having a first measurement axis;
a second magnetic field sensor having a second measurement axis; and
a third magnetic field sensor having a third measurement axis,
wherein the first measurement axis is arranged at a non-zero angle relative to the second measurement axis, each magnetic field sensor fixedly mounted within the internal bore of the rotatable cylindrical tubular member, each magnetic field sensor comprising a sensor core having an upper end and a lower end;
a first magnetic flux concentrating block disposed proximate to the upper end of each sensor core;
a second magnetic flux concentrating block disposed proximate to the lower end of each sensor core; and
an electronics unit disposed within the internal bore of the sensor housing and communicatively connected to each magnetic field sensor.

11. The magnetometer of claim 10, wherein the magnetic flux concentrating block is formed from a material having a magnetic permeability of 100 or greater.

12. The magnetometer of claim 10, wherein the magnetic flux concentrating block is formed from a material having a magnetic permeability of 1,000 or greater.

13. The magnetometer of claim 10, wherein
the magnetic field sensors are disposed within the internal bore of the rotatable cylindrical tubular member such that the measurement axis are each substantially perpendicular to a central axis of the sensor housing, and
the non-zero angle is substantially 90 degrees.

14. The magnetometer of claim 13, wherein the electronics unit is configured to estimate an angular position of the magnetometer and to compensate for an offset in the signal from the at least one magnetic sensor.

15. The magnetometer of claim 14, wherein the electronics unit is configured to compensate for the offset in the signal by subtracting an estimated offset signal estimated by averaging the signal over at least one rotation of the magnetometer.

16. The magnetometer of claim 10, wherein the rotatable cylindrical tubular member is made of one selected from the group consisting of a ferromagnetic material and a magnetic material.

17. The magnetometer of claim 10, wherein the magnetic field sensor is a magneto-resistive sensor or a flux gate sensor.

* * * * *